United States Patent
Reuschel

(10) Patent No.: US 8,041,488 B2
(45) Date of Patent: Oct. 18, 2011

(54) METHOD AND APPARATUS FOR DETERMINING THE SECURITY OF TRANSMISSION BETWEEN TWO FRICTIONALLY ENGAGED MOTION TRANSMITTING COMPONENTS

(75) Inventor: Michael Reuschel, Ottersweier (DE)

(73) Assignee: LuK Lamellen und Kupplungsbau Betelligungs KG, Bühl (DE)

( * ) Notice: Subject to any disclaimer, the term of this patent is extended or adjusted under 35 U.S.C. 154(b) by 900 days.

(21) Appl. No.: 11/287,504

(22) Filed: Nov. 26, 2005

(65) Prior Publication Data

US 2006/0154759 A1 Jul. 13, 2006

(30) Foreign Application Priority Data

Nov. 27, 2004 (DE) .......................... 10 2004 057 346

(51) Int. Cl.
*G06F 19/00* (2011.01)

(52) U.S. Cl. ................ 701/58; 701/51; 701/54; 701/55; 701/56; 477/8; 477/18; 477/28; 477/69; 477/70; 474/8; 474/9

(58) Field of Classification Search .................... 701/51, 701/54, 55, 56, 58; 477/8, 18, 28; 474/9
See application file for complete search history.

(56) References Cited

U.S. PATENT DOCUMENTS

| | | | | |
|---|---|---|---|---|
| 5,137,498 A | * | 8/1992 | Gunsing | 474/28 |
| 5,512,024 A | * | 4/1996 | Burton et al. | 477/102 |
| 6,661,220 B1 | * | 12/2003 | Glehr | 324/207.17 |
| 7,174,246 B2 | * | 2/2007 | Bitzer | 701/51 |
| 2004/0254705 A1 | * | 12/2004 | Bitzner | 701/50 |

FOREIGN PATENT DOCUMENTS

| | | |
|---|---|---|
| DE | 100 50 218 A1 | 4/2002 |
| DE | 103 10 831 A1 | 11/2003 |
| EP | 0 467 519 A1 | 1/1992 |
| JP | 2005003065 A | 1/2005 |
| WO | WO 02/101264 A2 | 12/2002 |

* cited by examiner

*Primary Examiner* — Mark Hellner
*Assistant Examiner* — Redhwan K Mawari
(74) *Attorney, Agent, or Firm* — Alfred J. Mangels

(57) ABSTRACT

A method and apparatus for determining a motion transmission value that provides security of motion transmission between two components that transfer motion through frictional engagement. The motion transmission value provides security of motion transmission through the reaction of the motion transmitted to a change in the contact force between the components that are frictionally engaged. The contact force is modulated in a predetermined frequency range during the motion transmission, and the change in the motion transmitted during the modulation of the contact force is detected. The change in the motion transmitted is evaluated using a filtering process, and the motion transmission value is determined as the result of the evaluation.

13 Claims, 2 Drawing Sheets

METHOD AND APPARATUS FOR DETERMINING THE SECURITY OF TRANSMISSION BETWEEN TWO FRICTIONALLY ENGAGED MOTION TRANSMITTING COMPONENTS

BACKGROUND OF THE INVENTION

1. Field of the Invention

The present invention relates to a method for determining a transmission value for the security of transmission of motion between two components that transmit motion through frictional engagement. The invention also relates to apparatus for carrying out such a method.

2. Description of the Related Art

For convenience, fuel consumption, and environmental reasons, automated power trains are being used more often in motor vehicles. Such power trains contain, for example, a belt-driven conical-pulley transmission with a continuously variable transmission ratio. To ensure prolonged reliable operation of such a transmission, suitable contact pressure between the endless torque-transmitting means and the conical disks is important. Suitable contact pressure means, first, that the pressure ensures that the endless torque-transmitting means does not slip, and, second, that the contact pressure is not unnecessarily high, so that it does not produce any unacceptable loads on parts or impair the operating efficiency as a result of the high hydraulic pressure that must be provided. To appropriately control or regulate the contact pressure, precise knowledge of the slippage condition or of the security of transmission between the conical disks of the belt-driven conical-pulley transmission and the endless torque-transmitting means is necessary. Direct measurement of that slippage is complicated and expensive, because in addition to the rotational speeds of the pulleys and the speed of the endless torque-transmitting means, it is also necessary to know the exact effective radii at which the frictional engagement between the endless torque-transmitting means and the conical surfaces of the pulleys occurs.

An object of the present invention is to provide a simply-executed method for determining a transmission value for the security of motion transmission in, for example, a belt-driven conical-pulley transmission. The invention also has as an object to provide apparatus for carrying out such a method.

SUMMARY OF THE INVENTION

The method portion of the object of the invention is achieved with a method for determining a transmission value for security of motion transmission between two components that transmit motion through frictional engagement, which transmission value describes the security of motion transmission through the reaction of the transmitted motion to a change in the contact force between the components that are frictionally engaged. The method includes the following steps:

modulation of the contact force in a predetermined frequency range during the transmission of motion, detection of the change in the transmission of motion during the modulation of the contact force, evaluation of the change in the transmission of motion using a filtering process, and determination of the transmission value as the result of the evaluation.

In the method in accordance with the present invention, in order to determine the transmission value it is simply necessary to modulate the contact force in a predetermined modulation frequency range and then to detect the change in the motion transmitted during the contact force modulation by using normal filtering processes.

Advantageously, the filtering takes place in a narrow frequency range around the frequency range of the modulation.

Furthermore, a bandpass filter is preferably used for filtering.

The steepness of slope of one or more utilized filters is preferably at least 40 db/decade.

In a preferred embodiment of the method in accordance with the present invention, all relative maxima between the zero crossings are used to determine information about the security of transmission between the motion-transmitting components.

It is also advantageous to obtain information about the security of transmission from an average value of all relative maxima.

In the method in accordance with the present invention, a low pass filter is advantageously used in the evaluation.

It is especially advantageous if the motion-transmitting components in the method in accordance with the present invention are the two pulley pairs of a belt-driven conical-pulley transmission with continuously variable transmission ratio, operatively connected with each other by an endless torque-transmitting means, and the contact force between the pulley pairs and the endless torque-transmitting means is modulated.

A method carried out in such a belt-driven conical-pulley transmission includes the following steps:

determination of the transmission ratio $i_{var}$ of the belt-driven conical-pulley transmission from the difference in the rotational speeds $\omega_{SS1}$ and $\omega_{SS2}$ of the two pulley pairs, low-pass filtering of the transmission ratio $i_{var}$ to produce the value $i_{vartp}$, determination of the difference in rotational speeds $\Delta\omega = \omega_{SS1} - i_{vartp}\omega_{SS2}$, obtaining the value $\Delta\omega mwf = \Delta\omega - \Delta\omega_{mw}$, where $\Delta\omega_{mw}$ is the average of $\Delta\omega$, band pass filtering of the value $\Delta\omega_{mwf}$ to obtain the value $\Delta\omega_{bp}$, obtaining the transmission value by low-pass filtering or taking the moving average of the value $\Delta\omega_{bp}$.

Apparatus is provided for determining a transmission value that provides security of motion transmission between two components that transmit motion through frictional engagement, which transmission value provides the security of motion transmission through the reaction of the motion transmitted to a change in the contact force between the components that are frictionally engaged. The apparatus includes a modulation unit for modulating the contact force in a predetermined frequency range during motion transmission, a motion detecting unit for detecting the change in the motion transmitted during the modulation of the contact force, and an evaluation unit containing at least one filter for evaluating the change in the motion transmitted and for determining the transmission value as the result of the evaluation using the method.

The method and apparatus in accordance with the present invention can be utilized to determine the security of motion transmission for any components that transmit motion through frictional engagement. For example, where one component can rotate, where the other component can move linearly, where two components are rotating in frictional engagement, where two components are connected with each other by a third component, for example in a belt-driven conical-pulley transmission, etc. The transmission value that describes the security of transmission is usually a value corresponding to slippage between two or more components that are frictionally engaged.

The invention is explained below on the basis of schematic drawings, for example in its application in a belt-driven conical-pulley transmission.

DESCRIPTION OF THE PREFERRED EMBODIMENTS

Figure 1:
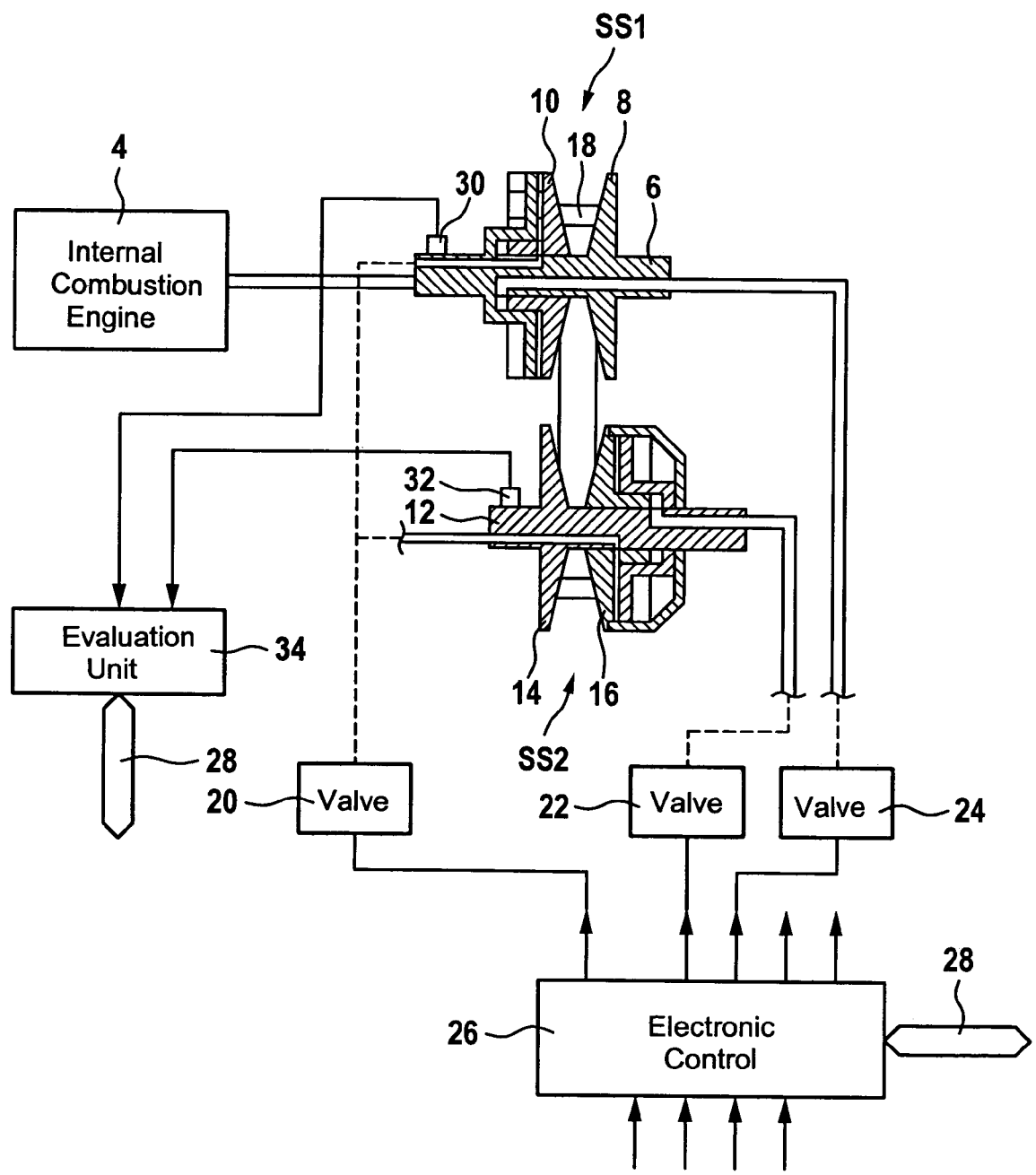
FIG. 1 is a schematic diagram of a part of a power train of a motor vehicle having a belt-driven conical-pulley transmission and corresponding control unit.
Figure 2:
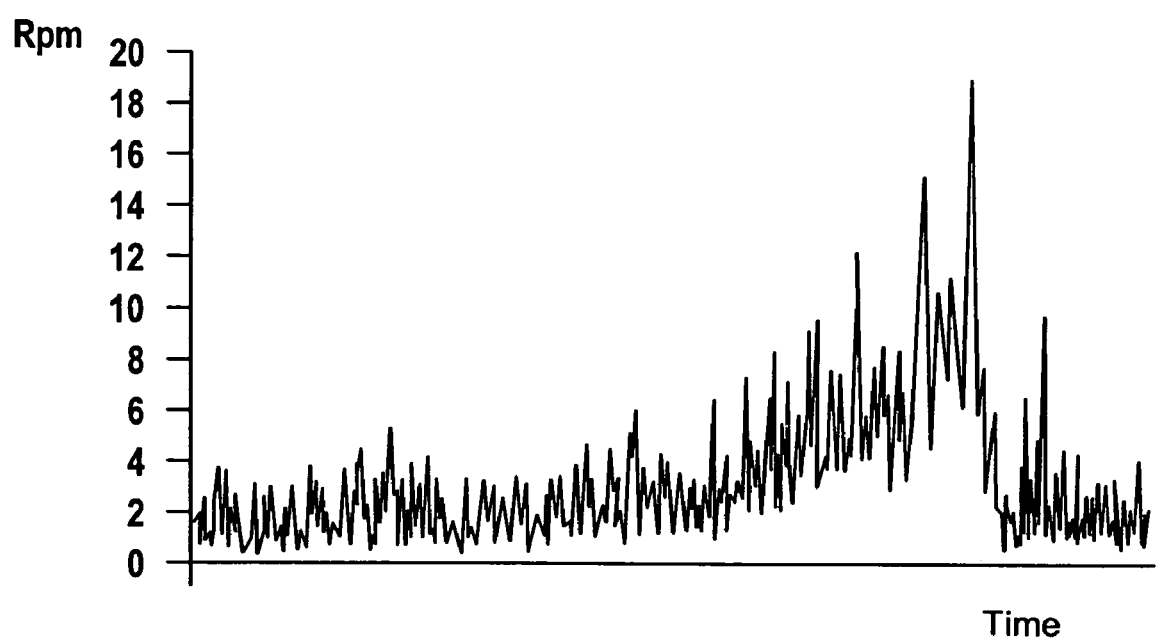
FIG. 2 is an example of a value provided by the method in accordance with the present transmission and corresponding to the slippage between the pulley pairs of a transmission of the type shown in FIG. 1 and that are frictionally engaged through an endless torque-transmitting means.

FIG. 1 shows a portion of a power train of a motor vehicle with the associated control devices. An input shaft 6 is driven by an internal combustion engine 4 and the interposition of a clutch (not shown), preferably an automated clutch, and a reversible-rotation-direction transmission, is rigidly connected to one conical disk 8 of an input side pulley set SS1. Another conical disk 10 is positioned on input shaft 6 so that it is rotationally fixed and axially movable. Positioned between conical disk 10 and a supporting part that is rigidly connected to input shaft 6 are pressure chambers by which, when they are pressurized, it is possible to change the force with which conical disk 10 can be pressed in the direction of conical disk 8.

In a similar manner, a pulley set SS2 on the output side has a conical disk 14 that is rigidly connected to a take-off or output shaft 12, and an axially movable conical disk 16 that can be urged in the direction of conical disk 14 by pressurizing associated pressure chambers. Between the two pulley sets SS1 and SS2 an endless torque-transmitting means 18, for example a plate-link chain, circulates.

The contact force with which endless torque-transmitting means 18 contacts the conical surfaces of the pulley in a frictional connection is controlled by means of hydraulic valves 20, 22, and 24, wherein hydraulic valve 20, for example, determines in a known way a basic contact force that depends on the torque acting on input shaft 6, and the shifting of the transmission ratio is accomplished with hydraulic valves 22 and 24.

The control of valves 20, 22, and 24 is accomplished by an electronic control 26, at the inputs of which there are signals from sensors that contain essential information for controlling the valves. The input signals are converted to control signals for the valves in accordance with the algorithms that are stored in electronic control 26. Other outputs of electronic control 26 can trigger an automated clutch, for example. Hydraulic valves 22 and 24 for shifting the transmission ratio are not both essential. Advantageously, electronic control 26 communicates via a bus connector 28 with other controllers or electronic devices of the motor vehicle.

Since the construction and function of the arrangement described so far are known, further details will not be described.

Suitable contact force between endless torque-transmitting means 18 and pulley sets SS1 and SS2 is controlling for prolonged, reliable operation of the belt-driven conical-pulley transmission. That contact force must be such that the endless torque-transmitting means does not slip, i.e., that it does not slip more than permitted, and on the other hand it must not be unnecessarily high, so that the components are minimally stressed and the transmission operates with good efficiency.

The determination in accordance with the present invention of a transmission value that provides the security of motion transmission between the disk sets, or the respective pulley pairs, and the endless torque-transmitting means, which corresponds to the slippage, is explained below.

The rotational speed of input shaft 6 and of output shaft 12 is detected by speed sensors 30 and 32, respectively. Sensors 30 and 32 are connected to an evaluation unit 34, which communicates with other units via bus line 28.

With the help of hydraulic valve 20, for example, the contact pressure between the pulley pairs and the endless torque-transmitting means is modified with a predetermined excitation frequency.

In an additional procedural step, the rotational speeds of the input shaft and of the output shaft, which change with the modulation of the contact pressure depending on the existing slippage, are detected by rotational speed sensors 30 and 32. The momentary transmission ratio $i_{var}$ of the belt-driven conical-pulley transmission is determined from the quotient of the rotational speeds $\omega_{SS1}$ and $\omega_{SS2}$.

The momentary transmission ratio $i_{var}$ thus determined is then low-pass filtered to obtain an "average" value, so that the value $i_{vartp}$ is obtained.

With the help of the value thus obtained, a rotational speed difference $\Delta\omega = \omega_{SS1} - i_{vartp}\omega_{SS2}$ is determined.

That rotational speed difference, which fluctuates about an average value, subsequently clears the way for the average value, in which the expression $\Delta\omega_{mwf} = \Delta\omega - \Delta\omega_{mw}$ is generated, where $\Delta\omega_{mw}$ is the average value of $\Delta\omega$.

That is followed by low-pass filtering of the obtained value $\Delta\omega_{mwf}$ around the modulation or excitation frequency. All relative maxima between the zero crossings are utilized to determine the amplitudes. As bandpass filters one can use, for example, $8^{th}$ order Butterworth filters, whose transmission region is between 30 and 36 Hz at an excitation or modulation frequency of 33 Hz.

The value $\Delta\omega_{bp}$ obtained by bandpass filtering is low-pass filtered, or subjected to the taking of a moving average, to determine the transmission value, so that the transmission value is a measure of the slippage with which the belt-driven conical-pulley transmission operates.

The transmission value determined in that way can be used to control or regulate the contact pressure of the belt-driven conical-pulley transmission in such a way that the belt-driven conical-pulley transmission always operates with the optimal or efficient slippage.

As the above explanation shows, the method and apparatus in accordance with the present invention require only a few sensors, and at the same time they operate with little demand on the computer.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the present invention.

What is claimed is:

1. A method for determining a motion transmission value that describes security of motion transmission between two rotatable components that transmit motion through frictional engagement with a transmitting means, which motion transmission value provides information relative to security of motion transmission through the reaction of the motion that is transmitted between an input component and an output component to a change in the contact force between the components that are frictionally engaged, said method comprising the steps of:

setting a contact force between two frictionally engaged components;

modulating the contact force between the frictionally engaged components in a predetermined contact force change range and at a predetermined contact force excitation frequency during transmission of motion by the frictionally engaged components;

detecting rotational speed changes in the motion transmission resulting from the contact force modulation between the frictionally engaged components during the modulation of the contact force;

evaluating the detected rotational speed changes in the motion transmission resulting from the contact force modulation between the frictionally engaged components using a filtering process to obtain average rotational speed change values around the excitation frequency;

determining from the average rotational speed change values a security of motion transmission value representative of slippage between the frictionally engaged components as a result of the evaluation of the detected rotational speed changes; and adjusting the contact force between the frictionally engaged components based upon the determined security of motion transmission value, so that the frictionally engaged components operate at a contact pressure that avoids excessive slippage therebetween and that avoids excessive contact pressure therebetween.

2. A method according to claim 1, wherein the filtering process takes place in a narrow frequency range around the frequency range of the modulation.

3. A method according to claim 1, wherein a bandpass filter is used for filtering of the average rotational speed change values.

4. A method according to claim 3, wherein a filter having a slope steepness of at least 40 db/decade is used for filtering.

5. A method for determining a motion transmission value that describes security of motion transmission between two rotatable components that transmit motion through frictional engagement with a transmitting means, which motion transmission value provides information relative to security of motion transmission through the reaction of the motion that is transmitted between an input component and an output component to a change in the contact force between the components that are frictionally engaged, said method comprising the steps of:

setting a contact force between two frictionally engaged components;

modulating the contact force between the frictionally engaged components in a predetermined contact force change range and at a predetermined contact force excitation frequency during transmission of motion by the frictionally engaged components;

detecting rotational speed changes in the motion transmission resulting from the contact force modulation between the frictionally engaged components during the modulation of the contact force;

evaluating the detected rotational speed changes in the motion transmission resulting from the contact force modulation between the frictionally engaged components using a filtering process to obtain average rotational speed change values around the excitation frequency;

utilizing during contact force modulation all relative maxima of the rotational speed changes between zero crossings to determine rotational speed amplitudes to provide information about the security of motion transmission between the frictionally engaged components;

determining from the average rotational speed change values a security of motion transmission value representative of slippage between the frictionally engaged components as a result of the evaluation of the detected rotational speed changes; and adjusting the contact force between the frictionally engaged components based upon the determined security of motion transmission value, so that the frictionally engaged components operate at a contact pressure that avoids excessive slippage therebetween and that avoids excessive contact pressure therebetween.

6. A method for determining a motion transmission value that describes security of motion transmission between two rotatable components that transmit motion through frictional engagement with a transmitting means, which motion transmission value provides information relative to security of motion transmission through the reaction of the motion that is transmitted between an input component and an output component to a change in the contact force between the components that are frictionally engaged, said method comprising the steps of:

setting a contact force between two frictionally engaged components;

modulating the contact force between the frictionally engaged components in a predetermined contact force change range and at a predetermined contact force excitation frequency during transmission of motion by the frictionally engaged components;

determining a mean value of all relative maxima of contact force changes during contact force modulation for information about security of motion transmission between the frictionally engaged components;

detecting rotational speed changes in the motion transmission resulting from the contact force modulation between the frictionally engaged components during the modulation of the contact force;

evaluating the detected rotational speed changes in the motion transmission resulting from the contact force modulation between the frictionally engaged components using a filtering process to obtain a average rotational speed change value values around the excitation frequency;

determining from the average rotational speed change values a security of motion transmission value representative of slippage between the frictionally engaged components as a result of the evaluation of the detected rotational speed changes; and adjusting the contact force between the frictionally engaged components based upon the determined security of motion transmission value, so that the frictionally engaged components operate at a contact pressure that avoids excessive slippage therebetween and that avoids excessive contact pressure therebetween.

7. A method according to claim 1, wherein a low-pass filter is used in the filtering process in the motion change evaluation.

8. A method according to claim 1, wherein the motion-transmitting components are two pulley sets of a belt-driven conical-pulley transmission having a continuously variable transmission ratio, wherein the pulley sets are joined with each other by an endless torque-transmitting means, and the contact force between the pulley sets and the endless torque-transmitting means is modulated.

9. A method according to claim 8, including the following steps:
   determining a transmission ratio $i_{var}$ of the belt-driven conical-pulley transmission from a quotient of rotational speeds $\omega_{SS1}$ and $\omega_{SS2}$ of the two pulley sets;
   low-pass filtering of the transmission ratio $i_{var}$ to produce a value $i_{vartp}$;
   determining a difference in pulley set rotational speeds $\Delta\omega = \omega_{SS1} - i_{vartp}\omega_{SS2}$;
   obtaining a value $\Delta\omega_{mwf} = \Delta\omega - \Delta\omega_{mw}$, wherein $\Delta\omega_{mw}$ is the average of $\Delta\omega$;
   band pass filtering of the value $\Delta\omega_{mwf}$ to obtain a value $\Delta\omega_{bp}$; and
   obtaining a security of motion transmission value by low-pass filtering of the value $\Delta\omega_{bp}$.

10. A method according to claim 8, including the following steps:
    determining a transmission ratio $i_{var}$ of the belt-driven conical-pulley transmission from a quotient of rotational speeds $\omega_{SS1}$ and $\omega_{SS2}$ of the two pulley sets;
    low-pass filtering of the transmission ratio i to produce a value $i_{vartp}$;
    determining a difference in pulley set rotational speeds $\Delta\omega = \omega_{SS1} - i_{vartp}\omega_{SS2}$;
    obtaining a value $\Delta\omega_{mwf} = \Delta\omega - \Delta\omega_{mw}$, wherein $\Delta\omega_{mw}$ is the average of $\Delta\omega$;
    band pass filtering of the value $\Delta\omega_{mwf}$ to obtain a value $\Delta\omega_{bp}$; and
    obtaining a security of motion transmission value by taking a moving average of the value $\Delta\omega_{bp}$.

11. A method according to claim 5, wherein the motion-transmitting components are two pulley sets of a belt-driven conical-pulley transmission having a continuously variable transmission ratio, wherein the pulley sets are joined with each other by an endless torque-transmitting means, and the contact force between the pulley sets and the endless torque-transmitting means is modulated, and including the following steps:
    determining a transmission ratio $i_{var}$ of the belt-driven conical-pulley transmission from a quotient of rotational speeds $\omega_{SS1}$ and $\omega_{SS2}$ of the two pulley sets;
    low-pass filtering of the transmission ratio $i_{var}$ to produce a value $i_{vartp}$;
    determining a difference in pulley set rotational speeds $\Delta\omega = \omega_{SS1} - i_{vartp}\omega_{SS2}$;
    obtaining a value $\Delta\omega_{mwf} = \Delta\omega - \Delta\omega_{mw}$, wherein $\Delta\omega_{mw}$ is the average of $\Delta\omega$;
    band pass filtering of the value $\Delta\omega_{mwf}$ to obtain a value $\Delta\omega_{bp}$; and
    obtaining a security of motion transmission value by low-pass filtering of the value $\Delta\omega_{bp}$.

12. A method according to claim 6, wherein the motion-transmitting components are two pulley sets of a belt-driven conical-pulley transmission having a continuously variable transmission ratio, wherein the pulley sets are joined with each other by an endless torque-transmitting means, and the contact force between the pulley sets and the endless torque-transmitting means is modulated, and including the following steps:
    determining a transmission ratio $i_{var}$ of the belt-driven conical-pulley transmission from a quotient of rotational speeds $\omega_{SS1}$ and $\omega_{SS2}$ of the two pulley sets;
    low-pass filtering of the transmission ratio $i_{var}$ to produce a value $i_{vartp}$;
    determining a difference in pulley set rotational speeds $\Delta\omega = \omega_{SS1} - i_{vartp}\omega_{SS2}$;
    obtaining a value $\Delta\omega_{mwf} = \Delta\omega - \Delta\omega_{mw}$, wherein $\Delta\omega_{mw}$ is the average of $\Delta\omega$;
    band pass filtering of the value $\Delta\omega_{mwf}$ to obtain a value $\Delta\omega_{bp}$; and
    obtaining a security of motion transmission value by low-pass filtering of the value $\Delta\omega_{bp}$.

13. A method according to claim 1, wherein the set contact force is a function of an input torque applied to one of an input component and an output component.

* * * * *